US005926109A

United States Patent [19]

Narusawa

[11] Patent Number: 5,926,109

[45] Date of Patent: Jul. 20, 1999

[54] RADIO SELECTIVE CALLING RECEIVER AND METHOD OF JUDGING RECEIVED DATA

[75] Inventor: Hideki Narusawa, Shizuoka, Japan

[73] Assignee: NEC Corporation, Japan

[21] Appl. No.: 08/932,281

[22] Filed: Sep. 17, 1997

[30] Foreign Application Priority Data

Sep. 19, 1996 [JP] Japan .................................... 8-248214

[51] Int. Cl.[6] ........................................................ H04Q 7/02

[52] U.S. Cl. .................................. 340/825.44; 340/311.1; 340/825.47; 340/825.69; 455/38.1; 455/31.3; 455/517

[58] Field of Search ............................ 340/825.44, 311.1, 340/825.47, 825.69; 455/38.1, 517, 31.3

[56] References Cited

U.S. PATENT DOCUMENTS

| | | | |
|---|---|---|---|
| 5,159,331 | 10/1992 | Park et al. | 340/825.44 |
| 5,291,192 | 3/1994 | Ichikawa et al. | 340/825.44 |
| 5,396,537 | 3/1995 | Schwendeman | 340/825.44 |

FOREIGN PATENT DOCUMENTS 3-267825 11/1991 Japan .

*Primary Examiner*—Brian Zimmerman
*Assistant Examiner*—Yves Dalencourt
*Attorney, Agent, or Firm*—Ostrolenk, Faber, Gerb & Soffen, LLP

[57] ABSTRACT

A data storage section 4 stores therein successively the data which has been received and their transmission numbers. A control section 3 operates a same call judging section 4, a transmission number comparing section 6 and a retransmission data detecting section 7, respectively, whereby when the newly received data and its transmission number are respectively identical to one of the newest M data stored in the data storage section and its transmission number, or the newly received transmission number is older than the newest transmission number stored in the data storage section and also the difference therebetween is equal to or smaller than X, it is judged that the data of interest is the retransmission data, while when the transmission number is newer than the newest transmission number stored in the data storage section by two or more, or when the transmission number is older than the newest transmission number and also the difference therebetween is larger than X, it is judged that the data omission is present.

24 Claims, 2 Drawing Sheets

RADIO SELECTIVE CALLING RECEIVER AND METHOD OF JUDGING RECEIVED DATA

BACKGROUND OF THE INVENTION

The present invention relates in general to a radio selective calling system for adding a transmission number to data to carry out the data transmission when the data is transmitted from a transmission system site to each of radio selective calling receivers, and more particularly, in this system, to a radio selective calling receiver which is provided with a facility for detecting retransmission data and an omission of the data on the basis of the transmission number contained in the received data.

In a radio selective calling system of this sort, when the data is transmitted from the transmission system site to each of the radio selective calling receiver, the assignment of the transmission number is carried out for every radio selective calling receiver, and the data is transmitted with the transmission number added to the associated data. In addition, there is the case where the data identical to the data which has already been transmitted is transmitted again from the transmission system. In such a case, however, the transmission number identical to the transmission number which was added to the data once is added to the data, and then the data is retransmitted. Incidentally, as for the system for carrying out the control in such a way that such a transmission number is added to the associated data and the data having the transmission number added thereto is transmitted, there is, for example, a well known system is designed in accordance with FLEX as the world-wide general standard, or ERMES as a European Standard.

On the other hand, in the radio selective calling receiver for use in the radio selective calling system of this sort, since the signal is received with the new data and the retransmission data mixed with each other as described above, the control for the reception based on the transmission number is carried out as follows:

(1) When the signal has been received, the transmission number is detected from the signal thus received.

(2) The received data which was received is stored in the order of the transmission numbers in the storage means.

(3) The transmission number which has been newly received and the data which has been received so as to follow the transmission number are compared with the newest M (M is an integral number) transmission numbers, which are stored in the above-mentioned storage means, and the newest M data received so as to follow the newest M transmission numbers, respectively. As a result, when the transmission number and the received data following the transmission number which are respectively identical in contents to those which have been received this time are present in the newest M transmission numbers and the newest M received data, respectively, the data which has been received this time is regarded as the retransmission data, and hence the warning for the data reception is not carried out.

(4) When the difference between the transmission number which has been newly received and the newest transmission number stored in the above-mentioned storage means is detected and it is equal to or larger than two, the warning that the data is failed to be received through the transmission data is present (hereinafter, referred to as "a data omission" for short, when applicable) is output. That is, when any transmission number is skipped, it is judged that there is a data omission, and then the user is informed of this fact.

An example of above-mentioned invention, JP-A-267825/1991 disclosed a radio selective calling receiver.

Now, in the above-mentioned conventional radio selective calling receiver, there arises the problem that when the retransmission data is received which has the transmission number older than any one of the newest M transmission numbers stored in the storage means, each of the above-mentioned warnings is not properly issued. This problem will hereinbelow be described by taking a concrete example.

For example, it is assumed that the newest M (M=4 in this example) transmission numbers out of the transmission numbers which have been received until now are stored in the storage means as follows:

153, 152, 151, 150

Then, it is assumed that under this condition, the retransmission data having the transmission number "148" is received. In this case, since the transmission number "148" is absent in the newest M transmission numbers, the data thus received is treated as the wholly new received data though it is the retransmission data, and hence the warning that the transmission data has been newly received is issued.

In addition, as a result of writing the transmission number "148" of the received data to the storage means since the received data is judged to be the wholly new received data, the newest M transmission numbers stored in the storage means are as follows.

148, 153, 152, 151

Then, it is assumed that thereafter, the data having the transmission number "154" is received. In this case, since the transmission number of the newest received data is "148", in the conventional radio selective calling receiver, it is judged that the data omission occurs in the reception of the data of the transmission numbers ranging from "147" to "154".

Thus, in the conventional radio selective calling receiver, when the retransmission data having the transmission number which does not match any one of the newest M transmission numbers stored in the storage means, it is not detected that the data of interest is the retransmission data, and also the retransmission data is treated as the new transmission data. As a result, when the new transmission data is then received, the mistaken warning for the data omission in reception is issued.

SUMMARY OF THE INVENTION

The present invention was made in the light of the foregoing problems associated with the prior art, and it is therefore an object of the present invention to provide a radio selective calling receiver which is capable of properly detecting the retransmission data and properly detecting the omission of the transmission data in reception even under the situation in which the data having the transmission data which is older than any one of a predetermined number of newest transmission numbers stored in the storage means is received.

The objective of the present invention is achieved by a radio selective calling receiver for use in a radio selective calling system for adding a transmission number to transmission data in every radio selective calling receiver for transmitting said transmission data and adding the same transmission number to transmission data for retransmitting said transmission data, said radio selective calling receiver comprising:

detection means for detecting both transmission data and its transmission number from a received signal;

storage means for successively storing therein said detected data and their transmission numbers;

retransmission data judging means for judging, when a newly received transmission number is older than a newest transmission number stored in said storage means and also a difference between said newly received transmission number and said newest transmission number is equal to or smaller than X (X is an arbitrary setting value), that said newly received data is retransmission data;

data omission judging means for judging, when a newly received transmission number is older than the newest transmission number stored in the storage means and also the difference between said newly received transmission number and said newest transmission number is larger than said X, that a data omission is present in said data in reception; and control means for writing, when judgment that said newly received data is said retransmission data was not carried out by said retransmission data judging means, both said newly received data and its transmission number to said storage means and also carrying out warning for said data reception, and warning for said data omission, when judgment that there was a data omission was carried out by said data omission judgment means.

According to the radio selective calling receiver of the present invention, even when the data having the transmission number which is older than any one of the newest M transmission numbers stored in the data storage section is received, since when the data of interest is the retransmission data, this fact can be detected, the retransmission data can be properly detected and also the omission of the transmission data can be properly detected.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Next, the present invention will be described with reference to the accompanying drawings.

Figure 1:
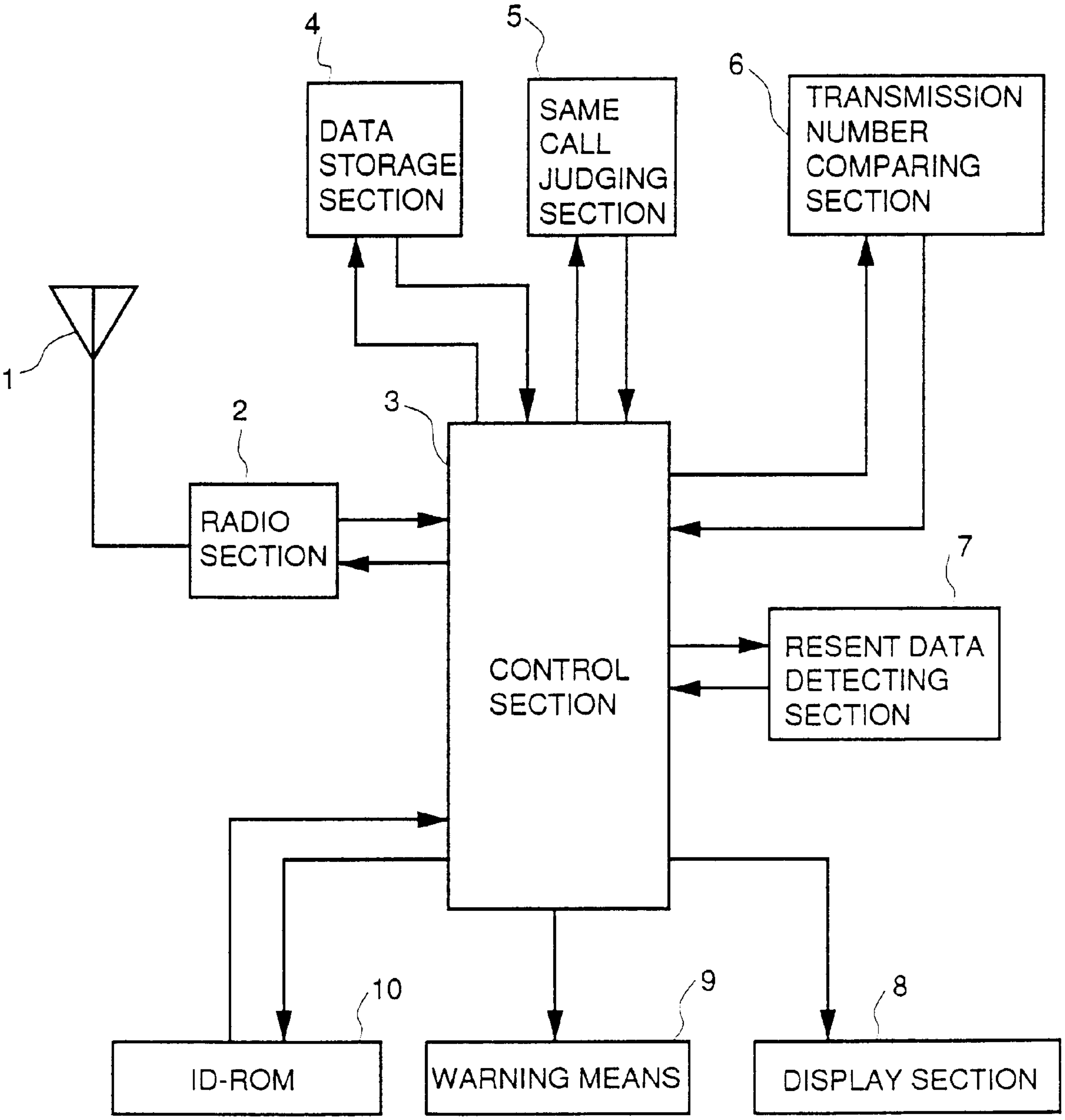
FIG. 1 is a block diagram showing a configuration of a radio selective calling receiver according to one embodiment of the present invention.

FIG. 1 is a block diagram showing a configuration of a radio selective calling receiver according to an embodiment of the present invention. As shown in FIG. 1, this radio selective calling receiver includes: a radio section 2 for demodulating a radio signal which is received through an antenna 1; a data storage section 4 for managing and storing therein, every transmission number, data (including its transmission number) which is received by the radio section 2; a same call judging section 5 for judging whether or not the data (including its transmission number) which is newly received by the radio section 2 is the same as the data which was received in the past; a transmission number comparing section 6 for judging whether or not an omission is present in the received transmission numbers; a retransmission data detecting section 7 for detecting whether or not the data which is newly received is the retransmission data; a display section 8 for displaying thereon the data, the transmission numbers and the like; warning means 9 for carrying out the warning using a vibrator, a speaker, an LED or the like; an ID-ROM 10 for storing therein a self-selective call number, and arbitrary setting values M and X; and a control section 3 for controlling these sections described above.

Now, the same call judging section 5 compares the data which has been newly received by the radio section 2 and its transmission number with the newest M data and the newest M transmission numbers which are stored in the data storage section 4, and judges that the newly received data is the retransmission data when the data which has been newly received by the radio section 2 and its transmission number match one of the newest M data and one of the newest M transmission numbers, respectively, and informs the control section 3 of this fact. When the control section 3 is informed that the newly received data is the retransmission data, the warning for reporting the data reception is not carried out by the warning means 9. Incidentally, the setting value M which is stored in the above-mentioned ID-ROM 10 is set in the data storage section 4 by the control section 3.

The transmission number comparing section 6 detects whether or not the omission is present in the transmission numbers by comparing the newly received transmission number with the newest transmission number stored in the data storage section 4. The control section 3 carries out the processing corresponding to that detection result. The processing will be concretely described as follows.

a) When the newly received transmission number is larger (i.e., newer) than the newest transmission number stored in the data storage section 4, and also the continuity is obtained between both the transmission numbers, the control section 3 is informed of that no omission is present in the transmission numbers. In this case, on the basis of the control by the control section 3, both the data which has been newly received and its transmission number are stored in the data storage section 4, the warning for reporting the data reception is carried out by the warning means 9, and at the same time, both that data and its transmission number are displayed on the display section 8.

b) When the newly received transmission number is larger than the newest transmission number stored in the data storage section 4 and also continuity is not obtained between both the transmission numbers, the control section 3 is informed that an omission is present in the transmission numbers. In this case, on the basis of the control by the control section 3, both the data which has been newly received and its transmission number are stored in the data storage section 4, the warning for reporting the data reception is carried out by the warning means 9, and at the same time, both that data and its transmission number are displayed on the display section 8. Thereafter, on the basis of the control by the control section 3, the warning for reporting the data omission is carried out by the warning means 9, and at the same time, the omitted transmission number is displayed on the display section 8.

c) When the newly received transmission number is smaller (i.e., older) than the newest transmission number stored in the data storage section 4, the judgment of existence and non-existence of the data omission based on the transmission numbers is not carried out. In this case, whether or not data omission is present is entrusted to the processing in the retransmission data detecting section 7.

The retransmission data detecting section 7 detects whether the newly received data is the data which has been transmitted for the first time this time or the retransmission data depending on whether or not the value which is obtained by subtracting the transmission number received by the radio section 2 from the newest transmission number stored in the data storage section 4 is larger than the arbitrary setting value X. Incidentally, the arbitrary setting value X which is stored in the above-mentioned ID-ROM 10 is set in the data storage section 4 through the control by the control section 3.

The processing of judging the retransmission data which is executed by the retransmission data detecting section 7 will be more concretely described as follows.

a) When the value which is obtained by subtracting the transmission number received by the radio section 2 from the newest transmission number stored in the data storage section 4 is larger than the setting value X, it is judged that the data omission occurs, and this introl section 3 is informed of the omitted transmission number. In this case, on the basis of the control by the control section 3, both the newly received data and its transmission number are stored in the data storage section 4, the warning for reporting the data reception is carried out by the warning means 9, and at the same time, both that data and its transmission number are displayed on the display section 8. Thereafter, on the basis of the control by the control section 3, the warning for reporting the data omission is carried out by the warning means 9, and at the same time, the omitted transmission number is displayed on the display section 8.

b) When the value which is obtained by subtracting the transmission number received by the radio section 2 from the newest transmission number stored in the data storage section 4 is smaller than the setting value X, it is judged that the newly received data is the retransmission data, and the control section 3 is informed of this fact.

In this case, the control section 3 compares the newly received data and its transmission number with all the data and their transmission numbers which are stored in the data storage section 4 in order to judge whether or not the newly received data and its transmission number match one of the data and its transmission number which are stored in the data storage section 4.

Then, if so, since it becomes clear that the newly received data is the retransmission data, the warning for the data reception by the warning means 9 is not carried out.

On the other hand, if not, it is judged that the newly received data is the retransmission data, but is the data which could not be received when carrying out the first calling. Then, on the basis of the control by the control section 3, both the newly received data and its transmission number are stored in the data storage section 4, the warning for reporting the data reception is carried out by the warning means 9, and at the same time, both that data and its transmission number are displayed on the display section 8. But, in this case, the processing is executed by the control section 3 in such a way that the newly received transmission number is not treated as the newest transmission number during the reception of the subsequent new transmission number.

Figure 2:
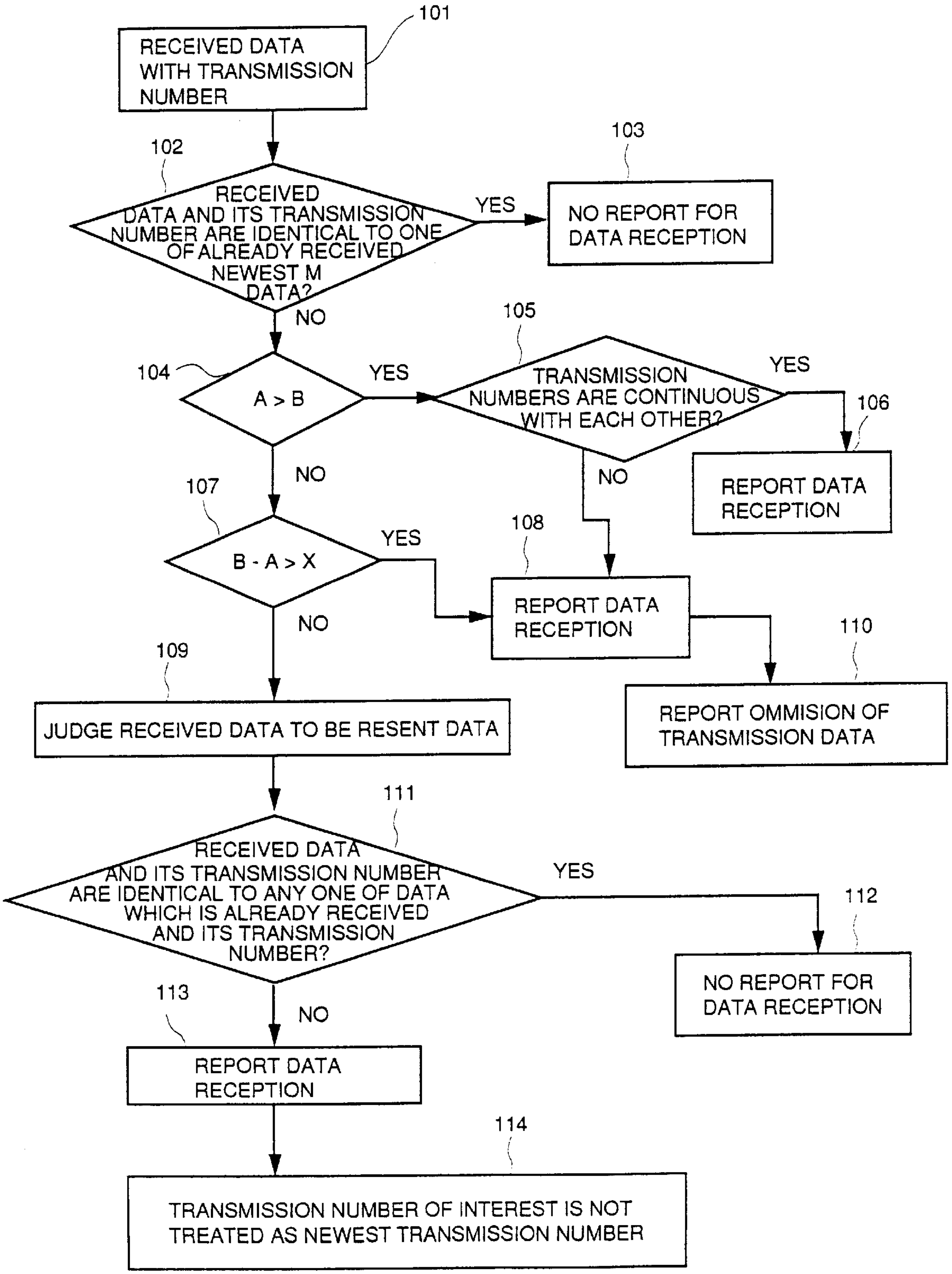
FIG. 2 is a flow chart showing the operation of the embodiment shown in FIG. 1.

FIG. 2 is a flow chart showing the operation of the judgment for the retransmission data in the present embodiment. The operation of the present embodiment will hereinafter be described with reference to the flow chart.

When the radio selective calling receiver has received the data with the transmission number (Step 101), it is judged whether or not the data thus received and its transmission number are identical to one of the newest M data and its transmission number which are already received (Step 102). If so, then it is judged that the newly received data is the retransmission data, and the warning for the data reception is not carried out (Step 103). The reason that the judgment for the retransmission data based on the comparison of the newly received data and its transmission number with the newest M data and their transmission numbers is firstly carried out in such a way that by processing firstly the matters which can be speedily judged, it is aimed that the total processing speed is increased.

If not, then it is judged whether or not the transmission number A of the newly received data is larger than the newest transmission number B which is already received (Step 104).

Then, when the transmission number A is larger than the transmission number B, it is judged whether or not the continuity is obtained between both the transmission numbers A and B (Step 105). If so, since the newly received data is the data next to the newest data of the newest transmission number B, the warning for the data reception is carried out (Step 106). If not, then it is judged that the data which could not be received is present between the data of the transmission number B and the data of the transmission number A. Then, firstly, the warning for the data reception is carried out (Step 108), and next, the warning for the data omission is carried out (Step 110).

On the other hand, when the transmission number A is smaller than the transmission number B, it is judged whether or not the value which is obtained by subtracting the transmission number A from the transmission number B is larger than the setting value X (Step 107). Then, when the value of (B−A) is larger than the setting value X, it is judged that the data which could not be received is present between the data of the transmission number B and the data of the transmission number A. Next, the warning for the data omission is carried out (Step 110).

On the other hand, when the value of (B−A) is smaller than the setting value X, it is judged that the newly received data is the retransmission data (Step 109). Then, it is judged whether or not the data which is identical to the data of interest and its transmission number are present in the data which is already received and their transmission numbers, respectively (Step 111). Then, if so, since it can be come to a conclusion that the data of interest is surely the retransmission data, the warning for the data reception is not carried out (Step 112).

On the other hand, if not, then it is judged that the first data of the newly received data could not be received, and the warning for the data reception is carried out (Step 113). But, the transmission number of the newly received data is not treated as the newest transmission number (Step 114).

The entire disclosure of Japanese Patent Application No. 8-248214 filed on Sep. 19, 1996 including specification, claims, drawing and summary are incorporated herein by reference in its entirety.

What is claimed is:

1. A radio selective calling receiver for use in a radio selective calling system for adding a transmission number to transmission data in every radio selective calling receiver for transmitting said transmission data and adding the same transmission number to transmission data for retransmitting said transmission data, said radio selective calling receiver comprising:

detection means for detecting both transmission data and its transmission number from a received signal;

storage means for successively storing therein said detected data and their transmission numbers;

retransmission data judging means for judging, when a newly received transmission number is older than a newest transmission number stored in said storage means, and when a difference between said newly received transmission number and said newest transmission number is equal to or smaller than X (X is an arbitrary setting value), that said newly received data is retransmission data;

data omission judging means for judging, when a newly received transmission number is older than the newest transmission number stored in the storage means and also the difference between said newly received transmission number and said newest transmission number is larger than said X, that a data omission is present in said data in reception; and control means for writing, when a judgment is made by said retransmission data judging means that said newly received data is not said retransmission data, both said newly received data and its transmission number to said storage means and also carrying out warning for said data reception, and warning for said data omission, when judgment that there was a data omission is determined by said data omission judgment means.

2. The radio selective calling receiver according to claim 1, wherein said retransmission data judging means further comprises means for judging, when said newly received data is identical to one of the newest M (M is an arbitrary setting value) data stored in said storage means, and its transmission number is identical to one of said newest M transmission numbers stored therein, that said newly received data is said retransmission data.

3. The radio selective calling receiver according to claim 1, wherein said data omission judging means further comprises means for judging, when said newly received transmission number is a transmission number which is newer than the newest transmission number stored in said storage means by equal to or larger than two, that a data omission is present in said data in reception.

4. The radio selective calling receiver according to claim 2, wherein only when whether or not the newly received data is identical to one of the newest M (M is an arbitrary setting value) data stored in said storage means and whether or not its transmission number is identical to one of the newest M transmission numbers stored therein are firstly judged by said retransmission data judging means, and based on said that judgment, said judgment with respect to said received transmission number is carried out by said retransmission data judgment means or said data omission judging means.

5. The radio selective calling receiver according to claim 4, wherein said retransmission data judging means judges whether or not the transmission number identical to said transmission number of interest is stored in said storage means when said newly received transmission number is older than said newest transmission number stored in said storage means and also a difference therebetween is equal to or smaller than X, and judging that said newly received data is firstly transmitted and also it is said retransmission data which has been failed to be received when said transmission number identical thereto is not stored in said storage means, and in such a case, said control means comprises means for controlling in such a way that both said data of interest and its transmission number are written to said storage means, and warning for said data reception, and said transmission number of interest is not treated as said newest transmission number.

6. A radio selective calling receiver for use in a radio selective calling system for adding a transmission number to data in every radio selective calling receiver for transmitting said transmission data and adding the same transmission number to transmission data for retransmitting said transmission data, said radio selective calling receiver comprising:

detection means for detecting both said data and its transmission number based on said received signal;

storage means for successively storing therein said received data and their transmission numbers;

retransmission data judging means for judging, when said newly received data is identical to one of the newest M (M is an arbitrary setting value) data stored in said storage means and also its transmission number is identical to one of said newest M transmission numbers stored therein, or when said newly received transmission number is older than said newest transmission number stored in said storage means and also a difference between said newly received transmission number and said newest transmission number is equal to or smaller than X (X is an arbitrary setting value), that said newly received data is said retransmission data;

data omission judging means for judging, when said newly received transmission number is newer than said newest transmission number stored in said storage means by two or more, or when said newly received transmission number is older than said newest transmission number stored in the storage means and also a difference between said newly received transmission number and said newest transmission number is larger than said X, that a data omission is present in said data in reception; and control means for writing, when judgment that said newly received data is said retransmission data was not carried out by said retransmission data judging means, both said data of interest and its transmission number to said storage means and also carrying out warning for said data reception, and warning for said data omission, when judgment that there was said data omission was carried out by said data omission judgment means.

7. The radio selective calling receiver according to claim 6, wherein only when whether or not said newly received data is identical to one of the newest M (M is an arbitrary setting value) data stored in said storage means and whether or not its transmission number is identical to one of said newest M transmission numbers stored therein are firstly judged by said retransmission data judging means, and also only when it is not judged based on that judgment that said data of interest is said retransmission data, judgment with respect to said newly received transmission number is carried out by said retransmission data judgment means or said data omission judging means.

8. The radio selective calling receiver according to claim 6, wherein said retransmission data judging means comprises for judging, when said newly received transmission number is older than said newest transmission number stored in said storage means and also a difference therebetween is equal to or smaller than X, whether or not said transmission number identical to said transmission number of interest is stored in said storage means, and judges, when said transmission number identical thereto is not stored in said storage means, that said newly received data is firstly transmitted and also it is said retransmission data which has been failed to be received, and in such a case, said control means comprises for controlling in such a way that both said data of interest and its transmission number are written to said storage means, and carries out warning for said data reception, and said transmission number of interest is not treated as said newest transmission number.

9. A radio selective calling receiver for use in a radio selective calling system for adding a transmission number to data in every radio selective calling receiver for transmitting said transmission data and adding the same transmission number to transmission data for transmitting said transmission data, said radio selective calling receiver comprising:

an antenna for receiving a received signal;

detection means for demodulating said received signal and detecting both data and its transmission number from said received signal;

storage means for storing successively therein both said received data and their transmission numbers;

display means for displaying thereon both said received data and their transmission numbers;

warning means for warning;

first judgment means for comparing a newly received data and its transmission number with the newest M (M is an arbitrary setting value) data and their transmission numbers stored in said storage means, and outputting a first judgment signal when said newly received data is identical to any one of said newest M data and also its transmission number is identical to any one of said transmission numbers of said newest M data;

second judgment means for comparing, when said first judgment signal is not outputted from said first judgment means, said newly received transmission number with the newest transmission number, and outputting a second judgment signal when said newly received transmission number is larger than said newest transmission number stored in said storage means and also said newly received transmission number is continuous with said newest transmission number, and outputting a third judgment signal when said newly received transmission number is newer than said newest transmission number stored in said storage means by equal to or larger than two, and outputting a fourth judgment signal when said newly received transmission number is smaller than said newest transmission number stored in said storage means;

third judgment means for calculating, when receiving said fourth judgment signal, a difference between said newly received transmission number and said newest transmission number, and outputting a fifth judgment signal when said difference is equal to or larger than X (X is an arbitrary setting value), and outputting a sixth judgment signal when said difference is equal to or smaller than said X;

control means for controlling in such a way that when receiving said first judgment signal, said warning by said warning means is not carried out, and when receiving said second judgment signal, both said newly received data and its transmission number are stored in said storage means, said warning for reporting said data reception is carried out by said warning means, and also both said data and its transmission number are displayed on said display means, and when receiving said third judgment signal, both said newly received data and its transmission number are stored in said storage means, said warning for reporting said data reception is carried out by said warning means and also both said data and its transmission number are displayed on said display means, and thereafter, it is reported by said warning means that there was a data omission, and said omitted transmission number is displayed on said display means, and when receiving said fifth judgment signal, both said newly received data and its transmission number are stored in said storage means, said warning for reporting said data reception is carried out by said warning means, and both said data and its transmission number are displayed on said display means, and thereafter, it is reported by said warning means that there was a data omission, and said omitted transmission number is displayed on said display means, and when receiving said sixth judgment signal, said newly received data and its transmission number are compared with all said data and their transmission numbers stored in said storage means, respectively, and then when said newly received data is identical to any one of all said data and also its transmission number is identical to any one of their transmission numbers, said warning for reporting said data reception is not carried out, while when said newly received data is not identical to any one of all said data and also its transmission number is not identical to any one of their transmission numbers, both said newly received data and its transmission number are stored in said storage means, said warning for reporting said data reception is carried out by said warning means, both said data and its transmission number are displayed on said display means, and also said transmission number of said newly received data is not treated as the newest transmission number at all.

10. A method of controlling retransmission data for use in a radio selective calling system for adding a transmission number to transmission data in every radio selective calling receiver for transmitting said transmission data and adding the same transmission number to retransmission data for retransmitting said retransmission data, said method comprising the steps of:

detecting both said data and its transmission number based on said received signal;

storing successively therein said received data and their transmission numbers;

judging, when said newly received data is identical to any one of the newest M (M is an arbitrary setting value) data which is previously stored and also its transmission number is identical to any one of said newest M transmission numbers thus stored, and when said newly received transmission number is older than said newest transmission number which is stored and also a difference between said newly received transmission number and said newest transmission number is equal to or smaller than X (X is an arbitrary setting value), that said newly received data is said retransmission data;

judging, when said newly received transmission number is newer than said newest transmission number which is previously stored by equal to or larger than two, and when said newly received transmission number is older than said newest transmission number thus stored and also a difference between said newly received transmission number and said newest transmission number is larger than said X, that a data omission is present in said data in reception; and storing, when judgment that said newly received data is said retransmission data was carried out by said retransmission data judging means, both said newly received data and its transmission number and also carrying out warning for said data reception, and carrying out, when it is judged that there was said data omission, a warning for said data omission.

11. The method according to claim 10, wherein when whether or not said newly received data is identical to any one of the newest M (M is an arbitrary setting value) data stored in a storage means and whether or not its transmission number is identical to any one of said newest M transmission numbers stored therein are firstly judged, and also only when it is not judged based on that judgment that said data of interest is said retransmission data, said retransmission data judgment or said data ommision judgment with respect to said newly received transmission number is carried out.

12. The method according to claim 10, wherein when said newly received transmission number is older than said newest transmission number stored in said storage means and also a difference therebetween is equal to or smaller than X, it is judged whether or not said transmission number identical to said transmission number of interest is stored in said storage means, and when said transmission number identical thereto is not stored in said storage means, it is judged that said newly received data is firstly transmitted and also it is said retransmission data which has been failed to be received, and in the case where that judgment has been carried out, both said data of interest and its transmission number are stored, and warning for said data reception is carried out, and also said transmission number of interest is not treated as said newest transmission number.

13. A radio selective calling receiver, comprising:

a detector detecting a transmission number and data corresponding to said transmission number from a received signal;

a storage unit storing said transmission number and said data;

a retransmission data judging unit, said retransmission data judging unit determines that said data is retransmission data when:

a difference between said transmission number and a next most recently received transmission number is equal to or less than a preset value, and said transmission number is less than said next most recently received transmission number;

a data omission judging unit, said data omission judging unit determines a data omission exists when:

said difference between said transmission number and said next most recently received transmission number is larger than said preset value, and said transmission number is less than said next most recently received transmission number;

a warning unit; and a controller controlling the functions of:

causing said storage unit to store said received transmission number and said data;

causing said warning unit to warn a user that said data has been received; and causing said warning unit to warn a user that a data omission has occurred when said data omission judging unit determines that said data omission exists.

14. The radio selective calling receiver according to claim 13, wherein said retransmission data judging unit further determines that said received data is said retransmission data when said received data and said transmission number are identical to one of a preset quantity of recently received data and a preset quantity of recently received transmission numbers, respectively, stored in said storage means.

15. The radio selective calling receiver according to claim 13, wherein said data omission judging unit further determines the existence of a data omission when said received transmission number is at least two transmission numbers newer than said next most recently received transmission number stored in said storage means.

16. The radio selective calling receiver according to claim 14, wherein said retransmission data judging unit and said data omission judging unit only determine said retransmitted data and said omitted data, respectively, after said retransmission data judging unit has determined whether said received data and said transmission number are identical to one of a preset quantity of recently received data and a preset quantity of recently received transmission numbers.

17. The radio selective calling receiver according to claim 16, wherein said controller further controls the function of causing said warning unit to warn that said data has been received when said transmission number is not a newest transmission number and when said retransmission data judging unit further determines that said received data and said corresponding transmission number are not identical to any one of respective previously received data and transmission numbers stored in said storage means.

18. A radio selective calling receiver according to claim 13, further comprising:

an antenna for receiving said received signal; and a display for displaying said data and said a transmission numbers.

19. A method for controlling a radio selective calling receiver, said method comprising the steps of:

detecting a transmission number and data corresponding to said transmission number from a received signal;

storing said transmission number and said data;

a first retransmission data determining step for determining that said data is retransmission data when:

a difference between said transmission number and a next most recently received transmission number is equal to or less than a preset value, and said transmission number is less than said next most recently received transmission number;

determining that a data omission exists when:

said difference between said transmission number and said next most recently received transmission number is larger than said preset value, and said transmission number is less than said next most recently received transmission number;

causing a warning unit to warn a user that said data has been received; and causing said warning unit to warn a user that a data omission has occurred when said data omission judging unit determines that said data omission exists.

20. The radio selective calling receiver control method according to claim 19, wherein said first retransmission data determining step further determines that said received data is said retransmission data when said received data and said transmission number are identical to one of a preset quantity of recently received data and a preset quantity of recently received transmission numbers, respectively, stored in said storage means.

21. The radio selective calling receiver control method according to claim 19, wherein said data omission determining step further determines the existence of a data omission when said received transmission number is at least two transmission numbers newer than said next most recently received transmission number stored in said storage means.

22. The radio selective calling receiver control method according to claim 20, further comprising a second retransmission data determining step, wherein said second retransmission data determining step and said data omission determining step only determine said retransmitted data and said omitted data, respectively, after said first retransmission data determining step has determined whether said received data and said transmission number are identical to one of a preset quantity of recently received data and a preset quantity of recently received transmission numbers.

23. The radio selective calling receiver control method according to claim 22, further comprising the step of causing a warning unit to warn that said data has been received when said transmission number is not a newest transmission number and when said second retransmission data determining step determines that said received data and said corresponding transmission number are not identical to any one of a respective previously received data and transmission numbers stored in said storage means.

24. A radio selective calling receiver control method according to claim 19, further comprising the steps of:

receiving said received signal; and displaying said data and said transmission numbers.

* * * * *